US012802679B2

(12) United States Patent
Ghosh et al.

(10) Patent No.: US 12,802,679 B2
(45) Date of Patent: Nov. 17, 2026

(54) SPEECH SYNTHESIS

(71) Applicant: NVIDIA Corporation, Santa Clara, CA (US)

(72) Inventors: Subhankar Ghosh, Santa Clara, CA (US); Shehzeen Hussain, San Diego, CA (US); Paarth Neekhara, San Diego, CA (US); Jing Yao Li, Toronto (CA); José Rafael Valle Gomes da Costa, Berkley, CA (US); Rohan Badlani, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 241 days.

(21) Appl. No.: 18/649,000

(22) Filed: Apr. 29, 2024

(65) Prior Publication Data

US 2025/0336389 A1 Oct. 30, 2025

(51) Int. Cl.
*G10L 13/02* (2013.01)
*G10L 25/30* (2013.01)

(52) U.S. Cl.
CPC .............. *G10L 13/02* (2013.01); *G10L 25/30* (2013.01)

(58) Field of Classification Search
CPC ................................ G10L 13/02; G10L 25/30
See application file for complete search history.

(56) References Cited

U.S. PATENT DOCUMENTS

| | | | | |
|---|---|---|---|---|
| 11,605,384 | B1 | 3/2023 | Dalton et al. | |
| 11,817,117 | B2 | 11/2023 | Vaidya et al. | |
| 2003/0022398 | A1 * | 1/2003 | Weng | G05B 19/41865 29/25.01 |
| 2021/0358490 | A1 | 11/2021 | Vaidya et al. | |
| 2021/0358493 | A1 * | 11/2021 | Lee | G10L 15/02 |
| 2023/0259540 | A1 | 8/2023 | Das et al. | |
| 2023/0316000 | A1 | 10/2023 | Mukherjee et al. | |
| 2024/0404509 | A1 * | 12/2024 | Yang | G10L 25/18 |
| 2025/0217683 | A1 * | 7/2025 | Cayet | G06N 7/01 |

* cited by examiner

*Primary Examiner* — Bhavesh M Mehta
*Assistant Examiner* — Joseph J. Yamamoto
(74) *Attorney, Agent, or Firm* — IRON SUMMIT IP LLP

(57) ABSTRACT

In various examples, learning monotonic alignment for language models in AI systems and applications is described herein. Systems and methods are disclosed that train one or more language models—such as LLMs or VLMs—using one or more techniques that improve the ability of the language model(s) to align inputs (e.g., text tokens) with outputs (e.g., speech tokens). For instance, to learn a stricter alignment and improve robustness of the language model(s), the training may encourage monotonic cross-attention scores using one or more attention priors and/or using one or more connectionist temporal classification (CTC) losses when updating the language model(s). For instance, the attention prior(s) may initialize the cross-attention scores to a monotonic heuristic while the CTC loss(es) may ensure the learned alignment attends over one or more text tokens (e.g., all text tokens) sequentially.

20 Claims, 11 Drawing Sheets

SPEECH SYNTHESIS

BACKGROUND

Language model-based text-to-speech (TTS) synthesis systems have shown promise in scaling to large speech datasets for generating expressive speech for new speakers with only a few seconds of reference audio. However, these language models may not be robust in some circumstances, such as when the input text is associated with multiple occurrences of the same text tokens. For instance, in these circumstances, the language models may generate output speech that includes repeating words, missing words, misaligned speech (which may be referred to as hallucinations), and/or other problems. Additionally, based on the auto-regressive nature of such language models, some of these problems may continue to repeat throughout the output speech. In some examples, these problems may be caused based on how the language models are trained. For example, during training in some instances, learning of alignments between the text tokens and the output speech (e.g., speech tokens) is not constrained to the monotonic nature of speech.

SUMMARY

Embodiments of the present disclosure relate to learning monotonic alignment for language models in AI systems and applications. Systems and methods are disclosed that train (e.g., update one or more parameters of) one or more language models—such as large language models (LLMs), vision language models (VLMs), etc.—using one or more techniques that improve the ability of the language model(s) to align inputs (e.g., text tokens) with outputs (e.g., speech tokens). For instance, the language model(s) may include a transformer in which an encoder is bi-directional and a decoder is auto-regressive. As such, to learn a stricter alignment and improve robustness of the language model(s), the training may encourage monotonic cross-attention scores using one or more attention priors and/or using one or more connectionist temporal classification (CTC) losses when updating the language model(s). For instance, the attention prior(s) may initialize the cross-attention scores to a monotonic heuristic while the CTC loss(es) may ensure the learned alignment attends over one or more text tokens (e.g., all text tokens) sequentially.

In contrast to conventional systems, the systems of the present disclosure train the language model(s) using additional or alternative technique(s)—such as the attention prior(s) and/or the CTC loss(es)—that improve the ability of the language model(s) to align the inputs with the outputs. For instance, and as discussed above, the conventional systems may only train the language model(s) to implicitly learn the alignments between the inputs and the outputs. However, by only including these implicit alignments, the language model(s) of the conventional systems may generate output speech that includes repeating words, missing words, misaligned speech, and/or other problems, such as when the input text includes repeating text tokens. However, the additional or alternative techniques described herein for training the language model(s) may be compatible with multiple types of language models, such as language models that include encoder-decoder transformers, and may also improve systems or applications that use these type of language models.

BRIEF DESCRIPTION OF THE DRAWINGS

The present systems and methods for learning monotonic alignment for language models in AI systems and applications are described in detail below with reference to the attached drawing figures, wherein.

DETAILED DESCRIPTION

Figure 1:
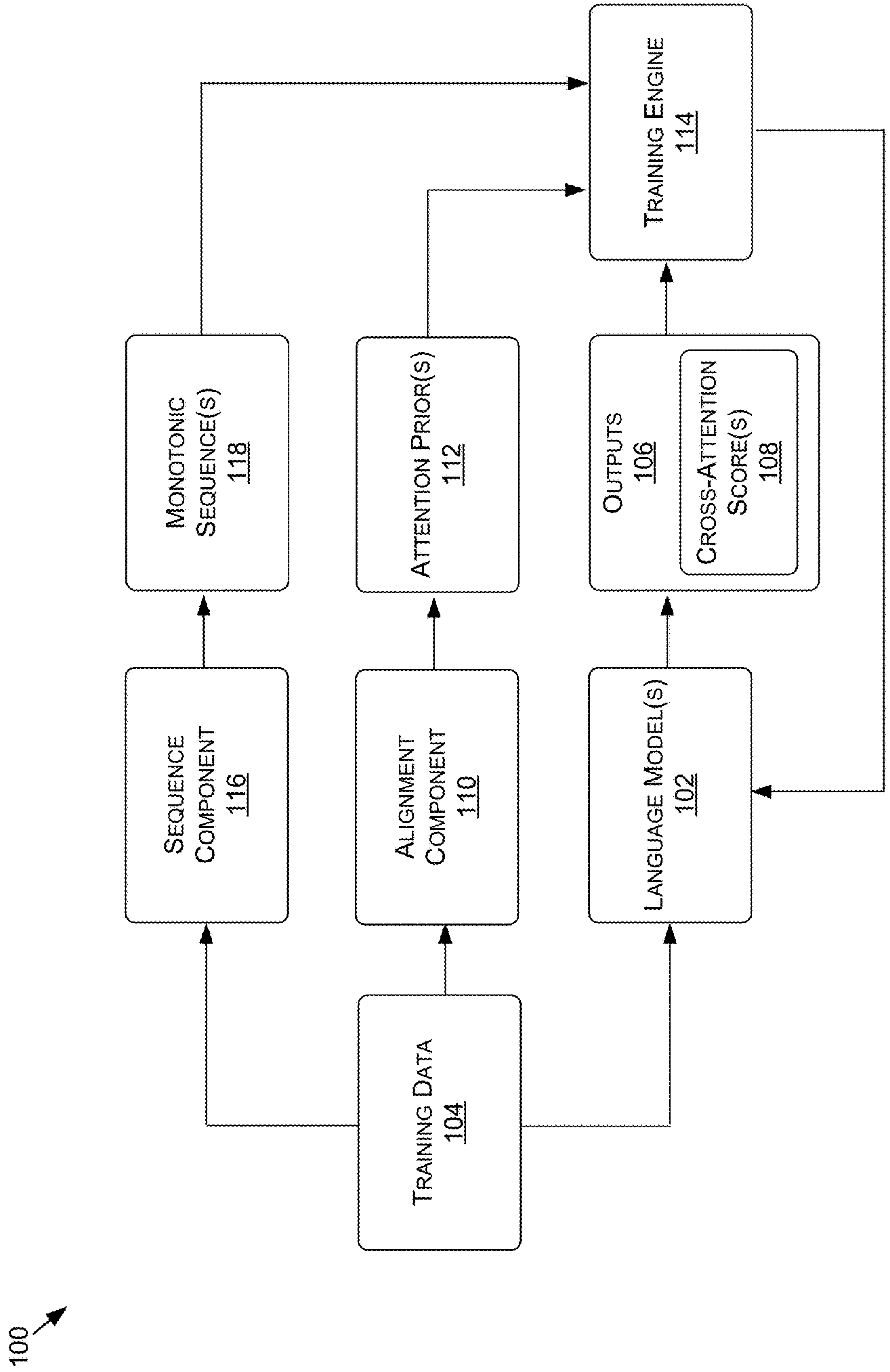
FIG. 1 illustrates an example of a process for training one or more language models to learn monotonic alignments between inputs and outputs, in accordance with some embodiments of the present disclosure.

Systems and methods are disclosed related to learning monotonic alignment for language models in AI systems and applications. For instance, a system(s) may train one or more language models, such as a large language model (LLM), a vision language model (VLM), a probabilistic language model, a neural network-based language model, and/or any other type of language model. In some examples, the language model(s) may include a transformer, such as an encoder-decoder transformer where the encoder is bi-directional and the decoder is auto-regressive. In such examples, the encoder and/or the decoder may include any number of layers, such as one layer, two layers, five layers, ten layers, fifteen layers, twenty layers, and/or any other number of layers. Additionally, a layer may include any number of heads, such as one head, two heads, five heads, eight heads, ten heads, and/or any other number of heads. For example, the decoder may include a number of layers where one or more of the layers (e.g., each layer) includes respective encoder-decoder cross-attention.

During training, the language model(s) may be trained to learn alignments between inputs, such as text tokens that represent training data (e.g., text) input into the language model(s), and outputs, such as speech tokens that are used to generate speech that corresponds to the training data. For instance, one or more layers (e.g., each layer) and/or one or more heads (e.g., each head) may implicitly learn respective cross-attention scores representing alignments between the text tokens and the speech tokens. As described herein, the robustness of the language model(s) may improve based at least on the language model(s) learning a stricter alignment between the text tokens and the speech tokens, such that the language model(s) is better able to process text that includes repeated text tokens without missing words, repeating words, and/or misaligning speech. As such, the system(s) may use one or more additional or alternative techniques, relative to prior approaches, during the training that improve the learning of the alignments between the text tokens and the speech tokens.

For instance, in some examples, the system(s) may determine a prior associated with an instance of the training data, where the instance corresponds to a text input that is applied to the language model(s). As will be described in more detail herein, the system(s) may determine the prior based at least on text tokens that represent the text and/or a duration (e.g., a number of speech timesteps, a number of speech tokens, a length of the mel-spectrogram(s), etc.) associated with output speech corresponding to the text. During training, the prior may then accelerate the learning of the alignment of the language model(s) by introducing a new loss by limiting sampling performed by the decoder to a most probable portion of a distribution associated with the prior. For instance, based at least on the language model(s) processing the text, the system(s) may determine one or more cross-attention scores associated with one or more (e.g., each) of the layer(s) and/or one or more (e.g., each) of the head(s). The system(s) may then apply the prior to one or more (e.g., each) of the cross-attention score(s) to obtain a posterior for training the language model(s). Additionally, in some examples, the system(s) may perform this process for any number of instances of the training data that correspond to any number of text inputs.

Additionally to or alternatively from using the prior(s), in some examples, the system(s) may use one or more connectionist temporal classification (CTC) losses when training the language model(s), where the CTC loss(es) may ensure that the language model(s) attends over one or more text tokens (e.g., all text tokens) sequentially. For instance, and as described in more detail herein, the system(s) may determine one or more monotonic sequences associated with text tokens that represent a text input corresponding to an instance of the training data. The system(s) may then use the monotonic sequence(s) and the cross-attention score(s) to determine the loss(es). For instance, in some examples, the system(s) may determine a lower loss when a sequence determined by the language model(s) is monotonic and/or covers all of the encoder timesteps and determine a greater loss when the sequence is not monotonic and/or does not cover all of the encoder timesteps. The system(s) may then use the loss(es) to update the language model(s) (e.g., update the parameters and/or weights of the language model(s). Additionally, the system(s) may perform this process for any number of instances of the training data that correspond to any number of text inputs.

In some examples, the system(s) may train the language model(s) in training stages using one or more of the techniques described herein. For instance, the system(s) may train the language model(s) during a first training stage using both the attention prior(s) and the CTC loss(es). Additionally, the system(s) may then train the language model(s) during a second, later training stage using the CTC loss(es), but without using the attention prior(s). In some examples, the training of the language model(s) using the attention prior(s) may be to convergence faster while the training of the language model(s) using the CTC may be to generate better alignments between the speech and text. In some examples, a training stage may be associated with any number instances of text inputs and/or any training duration. For example, a training stage may include training the language model(s) using one instance of text inputs, ten instances of text inputs, one hundred instance of text inputs, one thousand instances of text inputs, ten thousand instances of text inputs, and/or any other number of text inputs.

As described herein, during and/or after training the language model(s), the system(s) (and/or another system(s)) may be configured to use the language model(s) to perform one or more tasks. For instance, the system(s) may be configured to use the language model(s) to perform text-to-speech (TTS) and/or speech synthesis by receiving an input, such as an input that includes text (e.g., a question, an answer, a statement, etc.) and/or a context (e.g., acoustic tokens representing audio from a speaker), and generate an output that includes audio data representing speech. In some examples, such as when the language model(s) is configured to perform the speech synthesis, the speech may include one or more voice characteristics associated with the speaker that corresponds to the input context. While this is just one example task that the system(s) may be configured to perform using the language model(s), in other examples, the system(s) may be configured to perform one or more additional and/or alternative tasks using the language model(s), which are described herein.

In some examples, by performing one or more of these additional techniques when training the language model(s), the language model(s) may generate one or more cross-attention scores that include a stricter monotonic alignment as compared to if the language model(s) just implicitly learned the alignment of the cross-attention score(s) without using these additional techniques. As such, the language model(s) may be more robust and used to generate speech that includes fewer repeating words, fewer missed words, and/or a better alignment associated with the speech.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems implementing one or more vision language models (VLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example of a process 100 for training one or more language models 102 to learn monotonic alignment between inputs and outputs, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include applying at least a portion of training data 104 to the language model(s) 102. As described herein, the language model(s) 102 may include, but is not limited to, a large language model, a probabilistic language model, a neural network-based language model, and/or any other type of language model. For example, the language model(s) 102 may be included as part of a text-to-speech (TTS) system, such as a TTS synthesis system that is configured to generate speech associated with one or more speakers (e.g., the speech may be in one or more voices associated with the speaker(s)). As such, in some examples, the training data 104 that is applied to the language model(s) 102 may represent one or more instances of text and/or one or more contexts (e.g., acoustic tokens of audio) associated with the speaker(s). However, in other examples, the training data 104 applied to the language model(s) 102 may include other types of data, such as image data representing images, audio data representing sound (e.g., speech), and/or so forth.

In some examples, the training data 104 may be processed before being applied to the language model(s) 102 and/or may be processed by the language model(s) 102. For example, a neural audio codec model (which may also be represented by the language model(s) 102) may convert raw speech signals into tokenized representation. For instance, given an audio signal $y=y_1 \ldots y_t$, a neural audio codec model may output $C_{T\times N}$=CodecModel(y), where $C_{T\times N}$ is a two-dimensional acoustic matrix containing discrete nodes, T is a downsampled length, and N is a number of codebooks per timestep. In some examples, any type of acoustic codec model may be used, such as a Mel-FSQ codec (and/or any other codec). In some examples, one or more tokenization schemes may be used, such as sentence-piece tokens and phonemes tokens.

As shown, the process 100 may then include the language model(s) 102 processing the applied training data 104 (e.g., the tokens) and, based at least on the processing, generating outputs 106 that include at least one or more cross-attention scores 108. For instance, in some examples, the language model(s) 102 may include a transformer, such as an encoder-decoder transformer where the encoder is bi-directional and the decoder is auto-regressive. In such examples, the encoder and/or the decoder may include any number of layers, such as one layer, two layers, five layers, ten layers, fifteen layers, twenty layers, and/or any other number of layers. Additionally, a layer may include any number of heads, such as one head, two heads, five heads, eight heads, ten heads, and/or any other number of heads. For example, the decoder may include a number of layers where one or more of the layers (e.g., each layer) includes respective encoder-decoder cross-attention. While the examples herein describe the language model(s) 102 as include an encoder-decoder transformer, in other examples, the language model(s) 102 may only include a decoder.

As such, based at least on processing applied training data 104, the language model(s) 102 may generate the cross-attention score(s) associated with the layer(s) and/or the head(s) of the decoder. For instance, the language model(s) 102 may generate a respective cross-attention score 108 associated with one or more (e.g., each) layer of the decoder and/or one or more (e.g., each) head of the layer(s). As described herein, a cross-attention score 108 may indicate an alignment between inputs, such as text tokens corresponding to the text, and outputs, such as speech tokens associated with speech corresponding to the text. Additionally, during training, the language model(s) 102 may implicitly learn these alignments between the inputs and the outputs. In some examples, the performance and/or robustness of the language model(s) 102 may improve as the language model(s) better aligns the inputs with the outputs.

For example, to learn the alignment between mel-spectrograms X and text $\phi$, the training may include using an alignment learning objective that aims to maximize the likelihood of text given mel-spectrograms using a forward-sum algorithm. In some examples, the alignment between the text and speech may be constrained such that the alignment is monotonic, such as to avoid missing or repeating tokens. As such, the following equation may summarize a likelihood of text given a mel-spectrogram:

$$P(S(\phi) \mid X; \theta) = \sum_{s\in S(\phi)} \prod_{t=1}^{T} P(s_t \mid x_t; \theta) \tag{1}$$

In equation (1), s is a specific alignment between mel-spectrograms and text (e.g., $s1=\phi_1$, $s2=\phi_2$, $s3=\phi_3$, $sT=\phi_N$), $S(\Phi)$ is the set of one or more (e.g., all) possible valid monotonic alignments, and $P(s_t|x_t)$ is the likelihood of a specific text token $s_t=\phi_i$ aligned for mel frame $x_t$ and timestep t.

Figure 2:
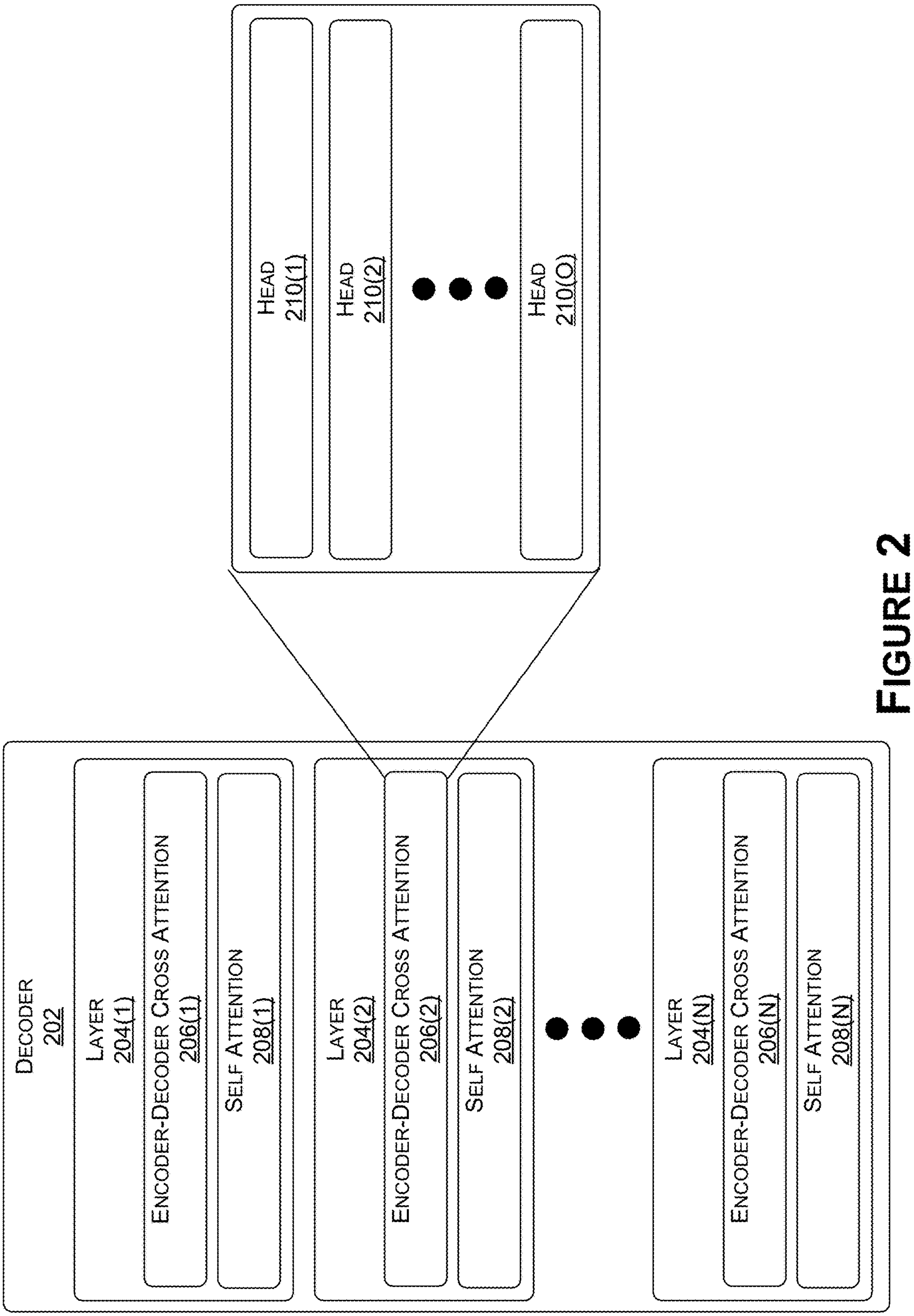
FIG. 2 illustrates an example of an architecture of a decoder associated with one or more language models, in accordance with some embodiments of the present disclosure.

For instance, FIG. 2 illustrates an example of an architecture of a decoder 202 associated with one or more language models (e.g., the language model(s) 102), in accordance with some embodiments of the present disclosure. As shown, the decoder 202 may include a number of layers 204(1)-(N) (also referred to singularly as "layer 204" or in plural as "layers 204"), where each of the layers 204 include encoder-decoder cross-attention 206(1)-(N) and self-attention 208(1)-(N). Additionally, the encoder-decoder cross-attention 206(1)-(N) includes a number of heads 210(1)-(O). As described herein, in some examples, the heads 210(1)-(O) of the encoder-decoder cross-attention 206(1)0(N) may each generate a respective cross-attention score (e.g., a respective cross-attention score 108).

Figure 3:
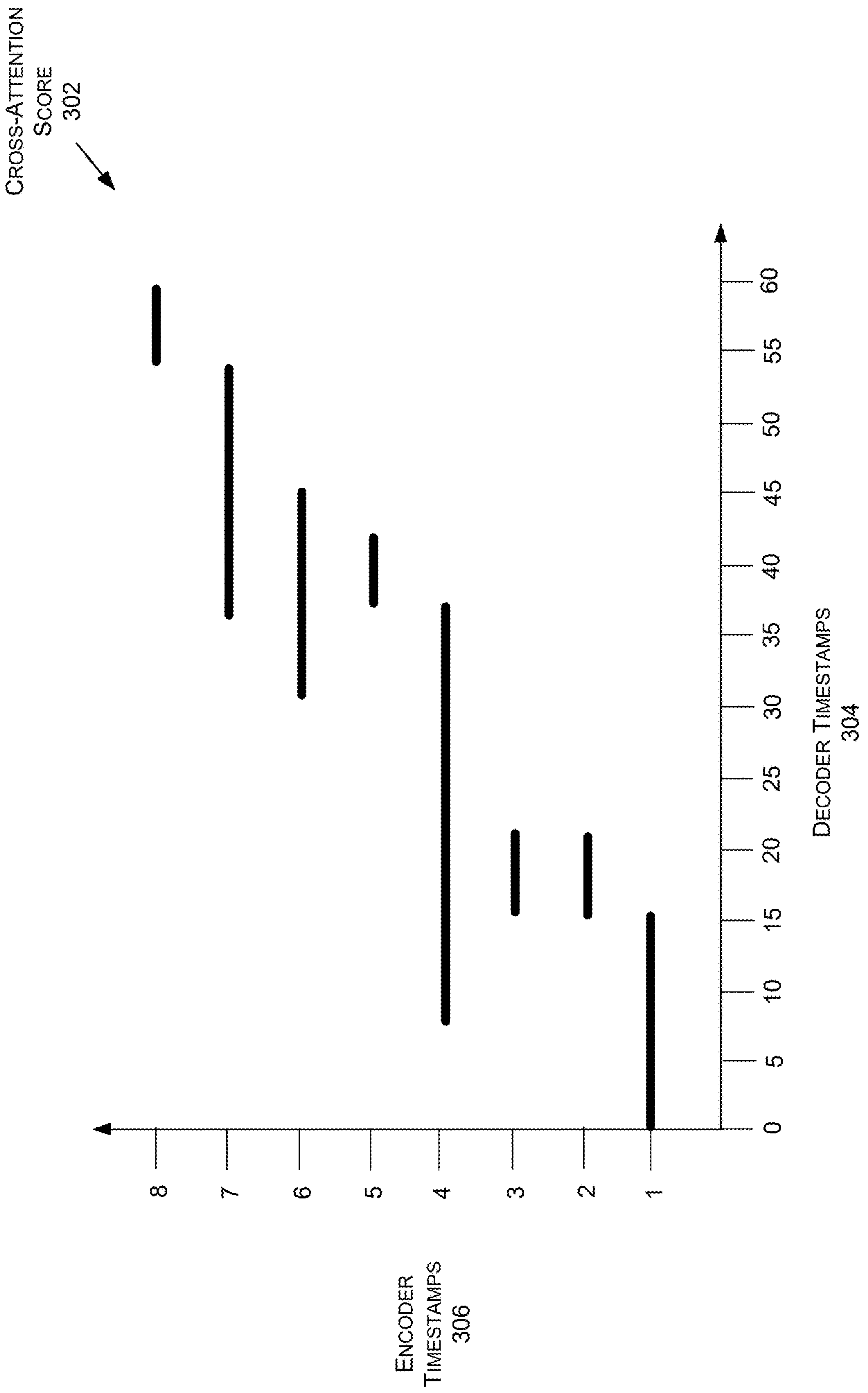
FIG. 3 illustrates an example of an implicitly learned cross-attention score associated with one or more language models, in accordance with some embodiments of the present disclosure.

For instance, FIG. 3 illustrates an example of an implicitly learned cross-attention score 302 associated with one or more language models (e.g., the language model(s) 102), in accordance with some embodiments of the present disclosure. As shown, the cross-attention score 302 indicates an alignment between decoder timesteps 304 and encoder timesteps 306. As described herein, in some examples, the encoder timesteps 306 may be associated with text tokens, such as eight text tokens in the example of FIG. 3. However, in other examples, the encoder timesteps 306 may be associated with any number of text tokens. Additionally, in some examples, the decoder timesteps 304 may be associated with a number of speech timesteps, a number of speech tokens, a length of the mel-spectrogram, and/or any other duration measurement associated with the output. While the example of FIG. 3 illustrates the decoder timesteps 304 as including a duration of 60, in other examples, the decoder timesteps 304 may include any other duration.

As shown, based at least on the language model(s) implicitly learning the cross-attention score 302, the alignment between the inputs and the outputs may be noisy and/or not monotonic. As such, and as described herein, the language model(s) and/or the synthesis system that uses the language model(s) may generate speech that includes missing words, repeating words, and/or is misaligned with respect to the input text. In some examples, these problems are even more prevalent in certain circumstances, such as when the input text is associated with multiple occurrences of the same text tokens. As such, one or more additional training techniques may be used to improve the alignment between the decoder timesteps 304 and the encoder timesteps 306.

For instance, and referred back to the example of FIG. 1, the process 100 may include using an alignment component 110 to process at least a portion of the training data 104 and, based at least on the processing, generate one or more attention priors 112. For instance, the alignment component 110 may generate a respective attention prior 112 for one or more (e.g., each) of the instances of input text represented by the training data 104. For example, and for an instance of input text, the alignment component 110 may determine an attention prior 112 (e.g., one or more characteristics associated with the attention prior 112, such as a width of the attention prior 112) based at least on text tokens that represent the input text and/or a duration (e.g., a number of speech timesteps, a number of speech tokens, a length of the mel-spectrogram, etc.) associated with output speech that corresponds to the input text. In some examples, the alignment component 110 may use one or more equations to generate the attention prior 112, such as the following:

$$P(mel,\text{ text, alignment}) = P(mel_t\ \text{text}_n \mid \text{alignment})P(\text{alignment}) \tag{2}$$

In equation (2), P(alignment) may include the attention prior 112 (e.g., a beta-binomial shaped attention prior) and P(mel, text|alignment) may include the L2 distance between the mel sample at time step t and the nth text phoneme in the sequence. As described herein, in some examples, the attention prior 112 may include boundaries and be positioned at a diagonal stretching from a bottom left corner to a top right corner of the cross-attention scores. However, in some examples, the attention prior 112 may be tunable such that different boundaries may be utilized.

For more detail, consider an attention-score matrix between the decoder and encoder timesteps $$A^{l,h}_{T\times M}$$

of the $h^{th}$ cross-attention head in decoder layer l. A static 2D prior may then be generated using 2D beta-binomial distribution between the input and output timesteps $P_{T'\times M'}$, where T' is a number of timesteps in the output and M' is a number of input timesteps. As such, given a prior, a re-scaled attention score may be determined by:

$$A^{l,h}_{T\times M}[a_s: a_e, q_s: q_e] \leftarrow A^{l,h}_{T\times M}[a_s: a_e, q_s: q_e] \odot P_{T'\times M'} \tag{3}$$

In some examples, $q_s$ and $q_e$ indicate the start and end of input timesteps ($M'=q_e-q_s$) and $a_s$ and $a_e$ indicate the start and end of the output ($T'=a_e-a_s$). As such, the attention prior for the first $S_1$ training iterations is applied. Next, the prior for one or more (e.g., all) ones of matrix $J_{T'\times M'}$ may be linearly annealed from the training step $S_1$. That is, for a training step S, where $S_1 \leq S \leq S_2$, the prior matrix may be obtained as:

$$P^S_{T'\times M'} = ((S_2 - S)\cdot P_{T'\times M'} + (S - S_1)\cdot J_{T'\times M'})/(S_2 - S_1) \tag{4}$$

Figure 4:
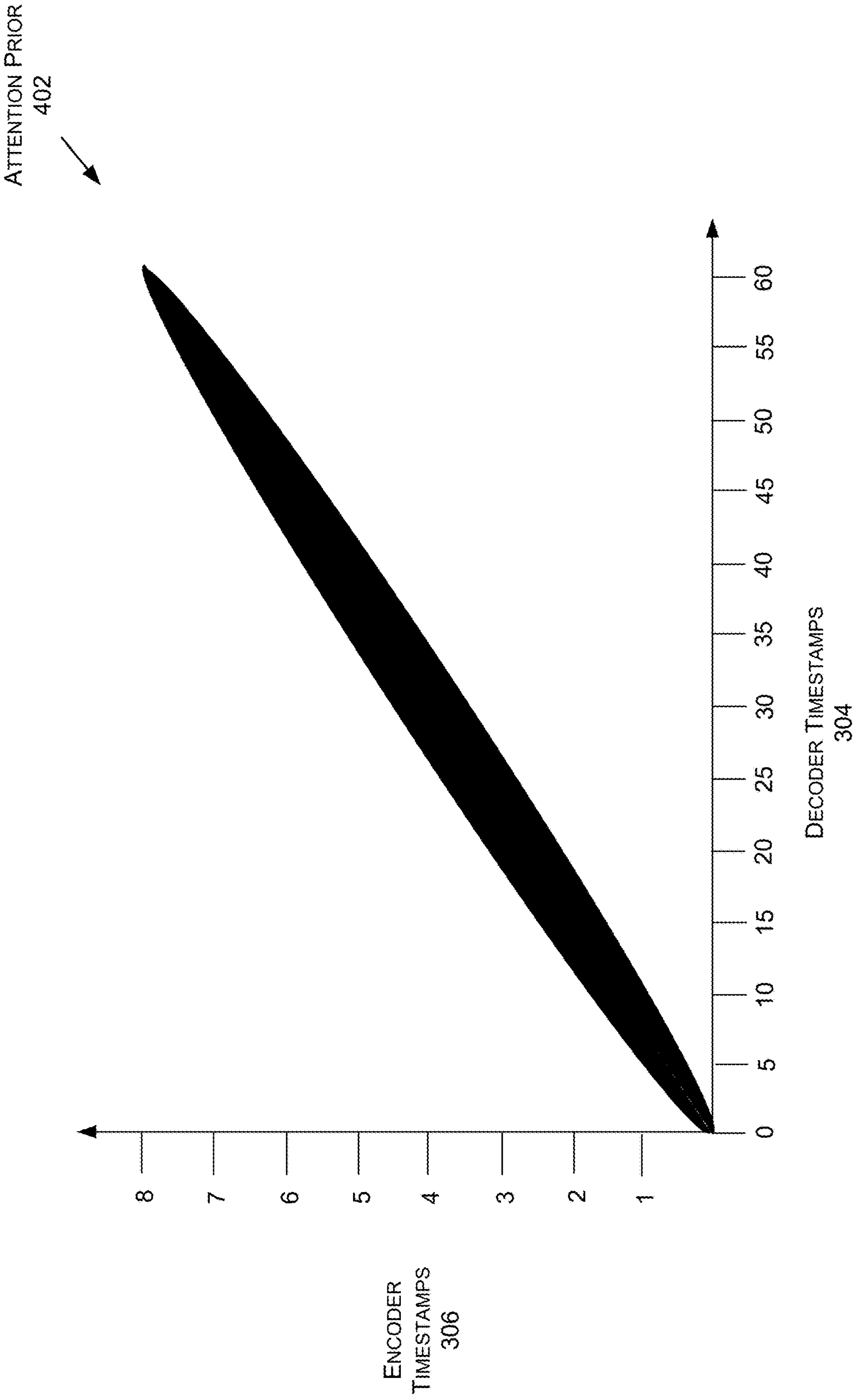
FIG. 4 illustrates an example of an attention prior corresponding to a cross-attention score, in accordance with some embodiments of the present disclosure.

For instance, FIG. 4 illustrates an example of an attention prior 402 corresponding to the cross-attention score 302, in accordance with some embodiments of the present disclosure. As shown, the attention prior 402 includes a cigar-shape (e.g., a wider middle than edges) and extends substantially along a diagonal from the bottom left to the top right. As described herein, this configuration may enable restriction of alignment at portions likely to be aligned, such as the beginning (bottom left) and end (top right), thereby potentially improving accuracy. For instance, the attention prior 402 may apply a boundary to limit sampling over a most probable portion of the distribution, which may improve the alignment performed by the language model(s). For example, the text tokens that fall outside of the attention prior 402 may be associated with low values, such as at or near zero, while text tokens that are within the attention prior 402 may be associated with high values, such as near or at one. Because of this, only a few text tokens may be analyzed by the decoder at one or more (e.g., each) of the decoder timesteps 304.

Referring back to the example of FIG. 1, the process 100 may include a training engine 114 using the attention prior(s) 112 and the cross-attention score(s) 108 while training the language model(s) 102. For instance, the training engine 114 may use the attention prior(s) 112 to accelerate and/or improve the alignment learning of the language model(s) 102 by at least making far-off-diagonal elements (e.g., text tokens) less probable. To perform this, and for an attention prior 112 $f_B$, the training engine 114 may apply the attention prior 112 $f_B$ over an alignment $P(s|X=s_t)$ to obtain the following:

$$f_B(k, \alpha, \beta) = \binom{N}{k}\frac{B(k+\alpha)B(N-k+\beta)}{B(\alpha, \beta)} \tag{5}$$

$$P_{posterior}(\phi = \phi_k \mid X = x_t) = P(\phi = \phi_k \mid X = x_t) \odot f_B(k, \omega t, \omega(T-t+1)) \tag{6}$$

In equations (5) and (6), the posterior is obtained for k={0, . . . , N}, wherein α and β are hyperparameters of beta function B(•,•), N is the number of tokens, and ω is a scaling factor controlling a width of the attention prior 112. While this is just one example of equations that may be used to train the language model(s) 102 using the attention prior(s) 112, in other examples, one or more additional and/or alternative equations may be used.

As described herein, in some examples, the training engine 114 may apply the attention prior 112 to one or more (e.g., each) of the cross-attention score(s) 108 associated with one or more (e.g., each) of the layer(s) of the decoder and/or one or more (e.g., each) of the head(s) of the layer(s). For example, if the language model(s) 102 generates fifty cross-attention scores 108, then the training engine 114 may apply the attention prior 112 to each of the fifty cross-attention scores 108. Additionally, in some examples, the training engine 114 may perform similar processes using one or more additional priors 112 associated with one or more additional instances of text input represented by the training data 104.

As further illustrated by the example of FIG. 1, the process 100 may include using a sequence component 116 to process at least a portion of the training data 104 and, based at least on the processing, generate one or more monotonic sequences 118 (e.g., CTC alignments) associated with the input text. For instance, the sequence component 116 may consider mapping input sequences $X=[x_1, x_2, \ldots, x_T]$, such as sequences of text tokens, to corresponding output sequences $Y=[y_1, y_2, \ldots, y_T]$, such as speech tokens. As such, the sequence component 116 may determine, for a given input sequence X, one or more (e.g., all) possible output sequences Y. In some examples, the sequence component 116 may use one or more techniques when generating the monotonic sequences 118.

For instance, since the lengths of the input sequences X and the output sequences Y may vary in length, the sequence component 116 may use a new token for the set of allowed outputs. In some examples, this new token may be placed within the sequences at specific positions, such as between two of the same characters that are in a row. Additionally, the sequence component 116 may generate the monotonic sequences 118 to be monotonic based on the input text.

The training engine 114 may then use the monotonic sequence(s) 118 and/or the cross-attention score(s) 108 to determine one or more losses, such as one or more CTC losses. For instance, the monotonic sequence(s) 118 may provide a natural way to go from probabilities associated with each timestep to a probability of an output sequence. For instance, a single CTC objective for a single (X, Y) pair may include:

$$p(Y \mid X) = \sum_{A \in A_{X,Y}} \prod_{t=1}^{T} p_t(a_t \mid X) \tag{7}$$

In some examples, the language model(s) 102 may be trained to determine the estimate per timestep probabilities $p_t(a_t|X)$. As such, the CTC conditional probability $p(Y|X)$ may marginalize over the set of valid alignments by computing the probability for a single alignment step-by-step. Additionally, ∝ may be a score at the merged alignments for a given node and $\propto_{s,t}$ may be the CTC score of a subsequent sequence $Z_{1:s}$ after t input steps. As such, a final CTC score, P(Y|X), may be computed from the last timestep of α.

In some examples, the training engine 114 may further compute a gradient to train the language model(s) 102. For instance, the CTC loss function may be differentiable with respect to the per timestep output probabilities since the CTC loss function sums the probabilities. Because of this, the training engine 114 may compute the gradient of the loss function with respect to output probabilities and then run backpropagation. For instance, and for a training set D represented by the training data 104, one or more parameters of the language model(s) 102 may be tuned to minimize the negative log-likelihood using:

$$\sum_{(X,Y) \in D} -\log p(X \mid Y) \tag{8}$$

Figure 5:
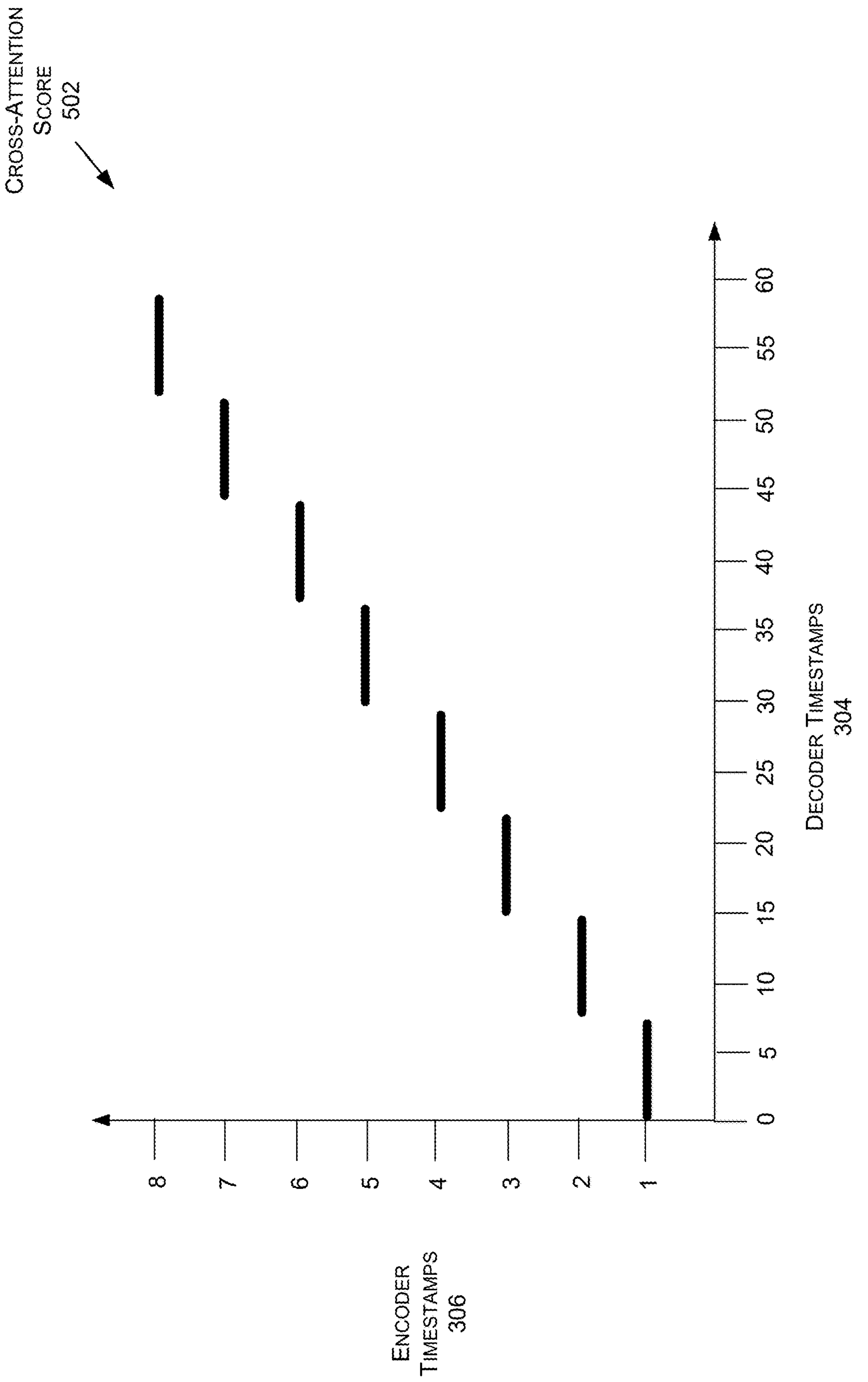
FIG. 5 illustrates an example of a cross-attention score associated with one or more language models after training the language model(s) using one or more attention priors and/or one or more CTC losses, in accordance with some embodiments of the present disclosure.

As such, by performing one or more of these additional or alternative techniques for training the language model(s) 102, the language model(s) 102 may have learned a better alignment between the inputs (e.g., the text tokens) and the outputs (e.g., the speech tokens). For instance, FIG. 5 illustrates an example of a cross-attention score 502 associated with one or more language models (e.g., the language model(s) 102) after training the language model(s) using one or more attention priors and/or one or more CTC losses, in accordance with some embodiments of the present disclosure. As shown, the cross-attention score 502 now includes a better alignment between the decoder timesteps 304 and the encoder timesteps 306 as compared to the cross-attention score 302. As such, and as described herein, the language model(s) may be more robust, such as by better aligning inputs (e.g., text tokens) with outputs (e.g., speech tokens).

Figure 6:
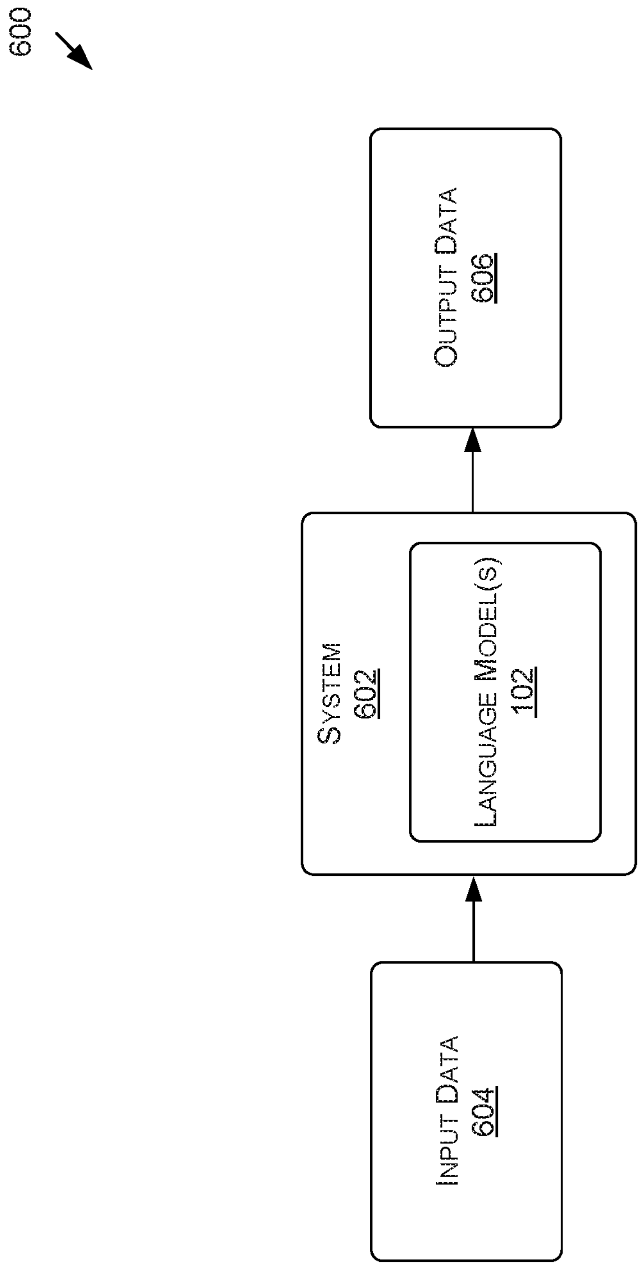
FIG. 6 illustrates an example of a process for using one or more language models that were trained to determine alignments between inputs and outputs, in accordance with some embodiments of the present disclosure.

As described herein, before, during, and/or after training the language model(s) 102, the language model(s) 102 may be used to perform one or more tasks. For instance, FIG. 6 illustrates an example of a process 600 for using the language model(s) 102 that was trained to determine alignments between inputs and outputs, in accordance with some embodiments of the present disclosure. As shown, the language model(s) 102 may be included within a system(s) 602 that is configured to perform the task(s). For instance, the system(s) 602 may be configured to synthesize speech (e.g., generate speech using a voice of a speaker), perform TTS, perform natural language understanding, perform automatic speech recognition, perform object detection, perform object tracking, perform speaker recognition, and/or perform any other type of task for which the language model(s) 102 may be used.

As shown, the process 100 may include the system(s) 602 receiving input data 604. As described herein, the input data 604 may include, but is not limited to, text data representing text (e.g., characters, numbers, words, symbols, etc.), audio data representing speech, contextual data representing a context (e.g., one or more acoustic tokens associated with alternative audio) associated with one or more speakers, image data representing images, and/or any other type of data. The process 100 may then include the system(s) 602 processing at least a portion of the input data 604 using the language model(s) 102 and, based at least on the processing, generating output data 606. As described herein, the output data 606 may include, but is not limited to, audio data representing speech, text data representing text, and/or any other type of data. For instance, if the system(s) 602 is configured to synthesize speech for a given speaker, then the input data 604 may include text data representing the text and context data representing a context associated with the speaker, and the output data 606 may include audio data representing speech associated with the text and in the voice of the speaker.

Figure 7:
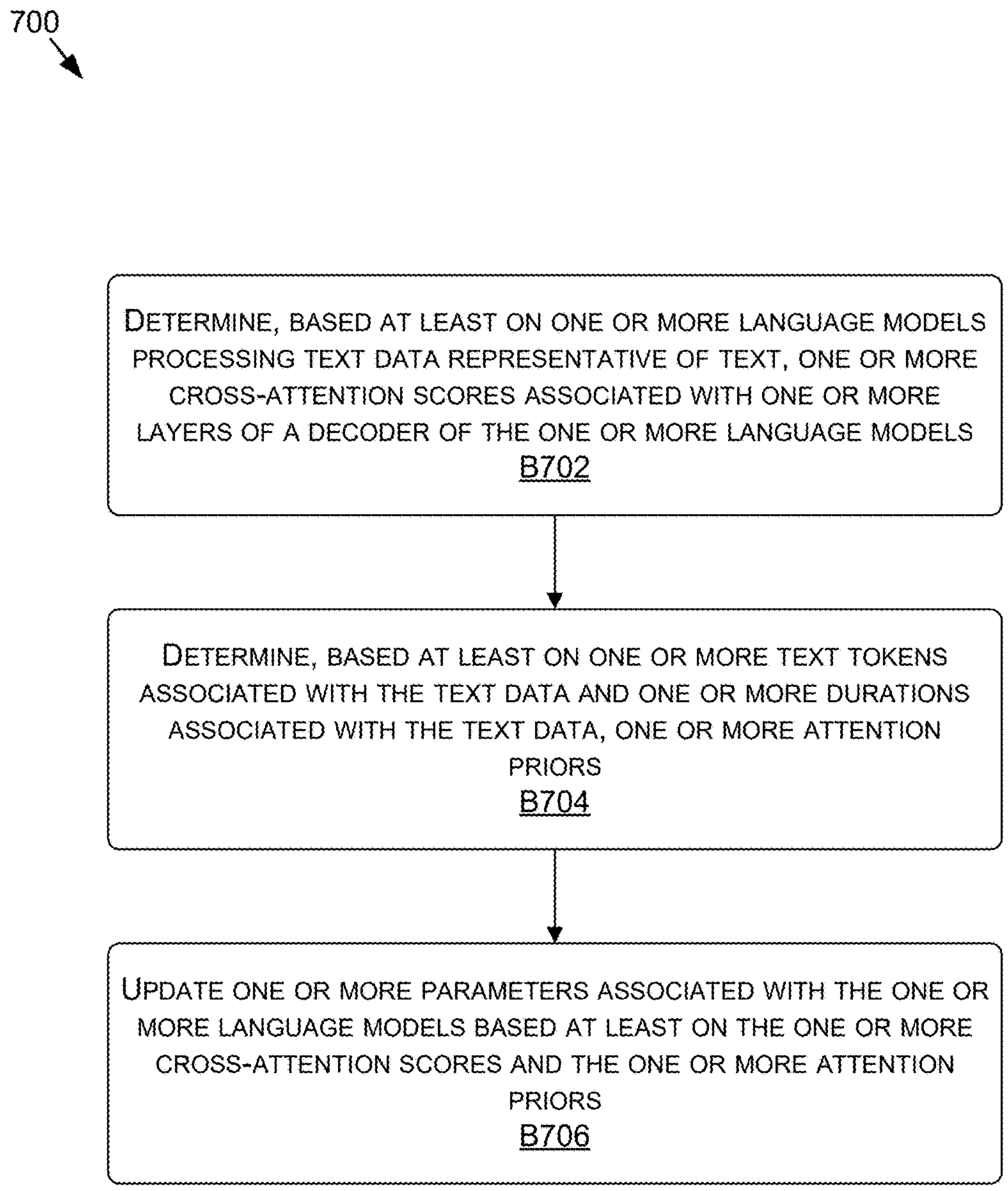
FIG. 7 illustrates a flow diagram showing a method for training one or more language models using one or more attention priors, in accordance with some embodiments of the present disclosure.
Figure 8:
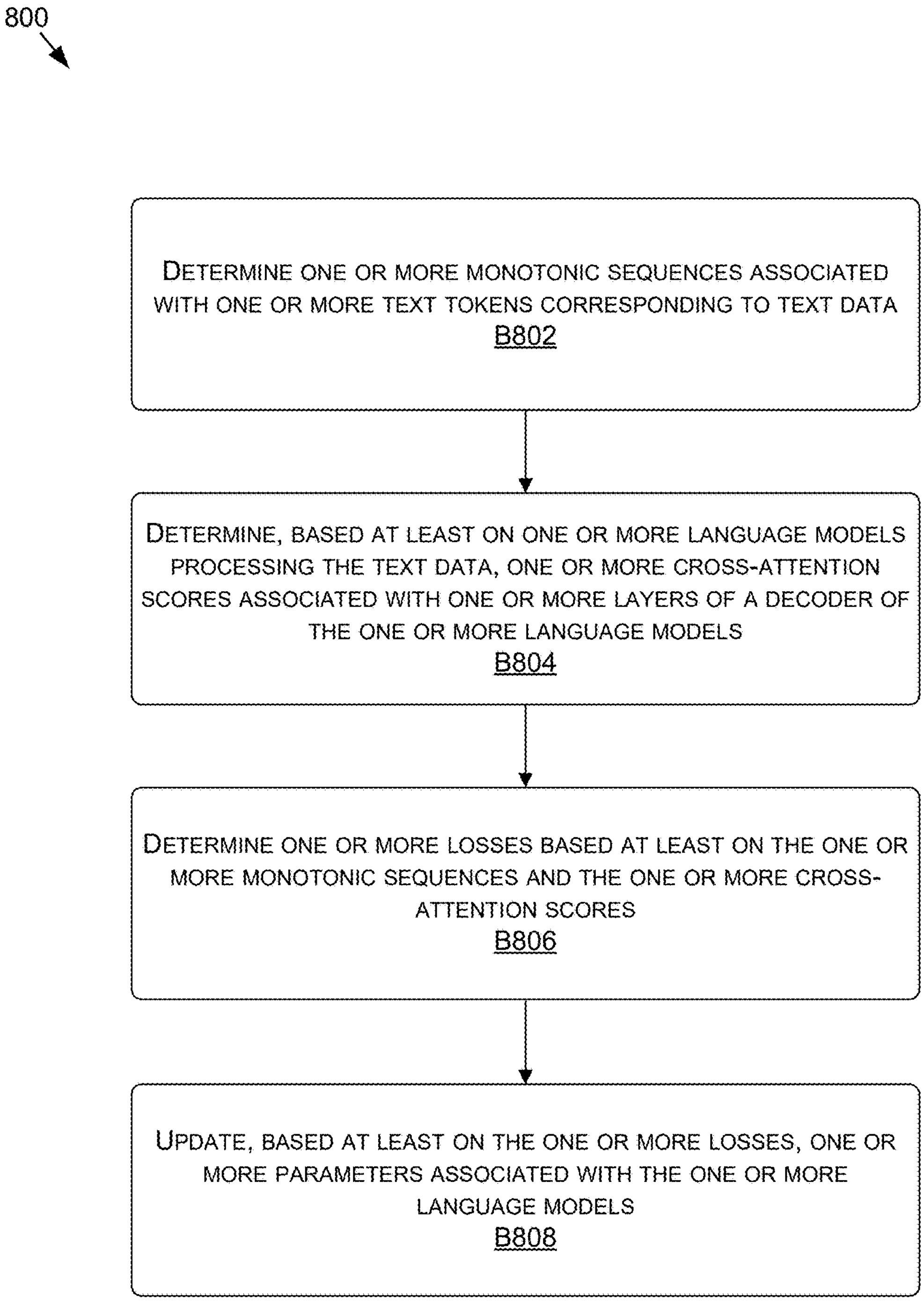
FIG. 8 illustrates a flow diagram showing a method for training one or more language models using one or more CTC losses, in accordance with some embodiments of the present disclosure.
Figure 9:
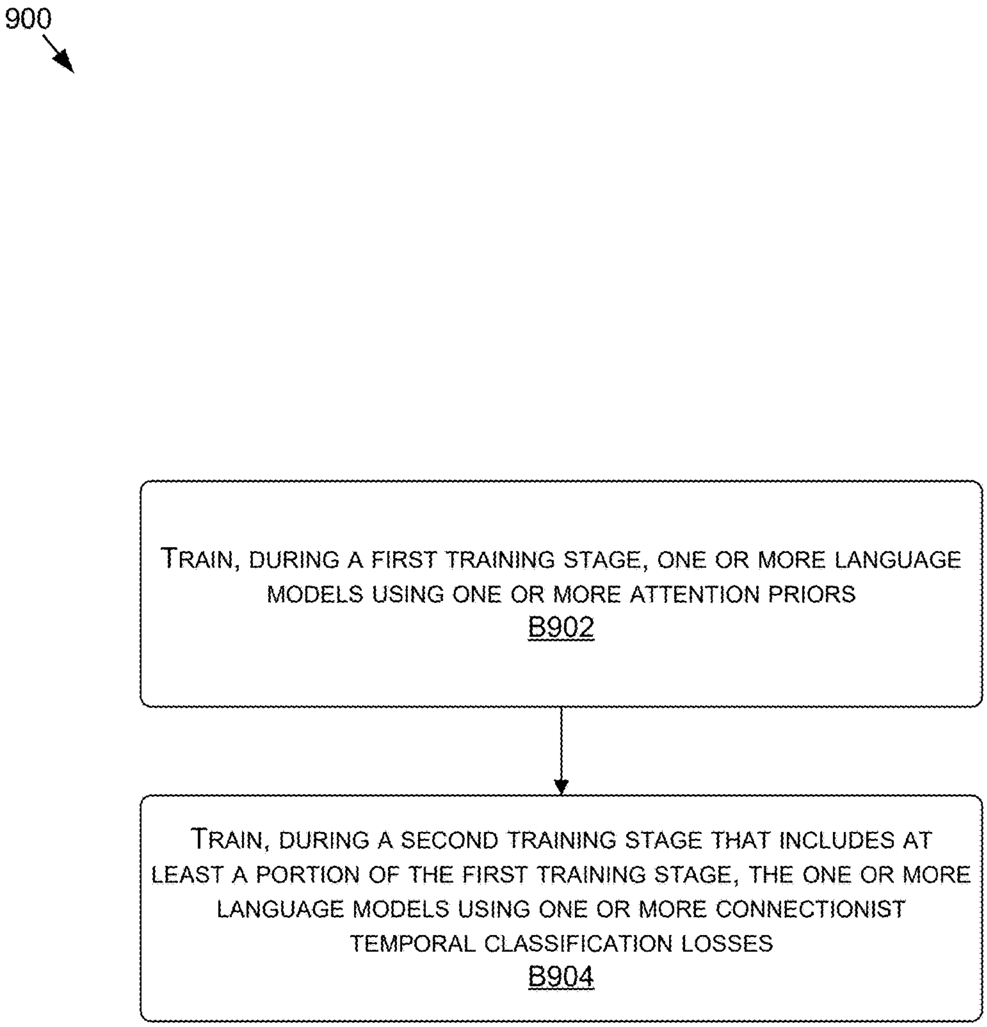
FIG. 9 illustrates a flow diagram showing a method for training one or more language models using one or more attention priors and one or more CTC losses at various training stages, in accordance with some embodiments of the present disclosure.

Now referring to FIGS. 7-9, each block of methods 700, 800, and 900, described herein, comprises a computing process that may be performed using any combination of hardware, firmware, and/or software. For instance, various functions may be carried out by a processor executing instructions stored in memory. The methods 700, 800, and 900 may also be embodied as computer-usable instructions stored on computer storage media. The methods 700, 800, and 900 may be provided by a standalone application, a service or hosted service (standalone or in combination with another hosted service), or a plug-in to another product, to name a few. In addition, the methods 700, 800, and 900 are described, by way of example, with respect to FIG. 1. However, these methods 700, 800, and 900 may additionally or alternatively be executed by any one system, or any combination of systems, including, but not limited to, those described herein.

FIG. 7 illustrates a flow diagram showing a method 700 for training one or more language models using one or more attention priors, in accordance with some embodiments of the present disclosure. The method 700, at block B702, may include determining, based at least on one or more language models and processing text data representative of text, one or more cross-attention scores associated with one or more layers of a decoder of the one or more language models. For instance, the language model(s) 102 may process at least a portion of the training data 104, such as the text data representing the text. Based at least on the processing, the language model(s) 102 may generate the cross-attention score(s) 108 associated with the layer(s) of the language model(s) 102. As described herein, the language model(s) 102 may generate a respective cross-attention score 108 associated with one or more (e.g., each) of the layer(s) and/or one or more (e.g., each) of the head(s) of the layer(s).

The method 700, at block B704, may include determining, based at least on one or more text tokens associated with the text data and one or more durations associated with the text data, one or more attention priors. For instance, the alignment component 110 may generate the attention prior(s) 112 based at least on the text token(s) associated with the text and the duration(s) associated with the text. As described herein, in some examples, the alignment component 110 may generate the attention prior(s) 112 to include a type of attention prior, such as a beta-binomial prior and/or any other type of prior.

The method 700, at block B706, may include updating one or more parameters associated with the one or more language models based at least on the one or more cross-attention scores and the one or more attention priors. For instance, the training engine 114 may update the parameter(s) of the language model(s) 102 using at least the cross-attention score(s) 108 and the attention prior(s) 112. As described herein, in some examples, the training engine 114 may update the parameter(s) by applying the attention prior(s) 112 to the cross-attention score(s) 108 in order to initialize the cross-attention score(s) 108 to a monotonic heuristic.

FIG. 8 illustrates a flow diagram showing a method 800 for training one or more language models using one or more CTC losses, in accordance with some embodiments of the present disclosure. The method 800, at block B802, may include determining one or more monotonic sequences associated with one or more text tokens corresponding to text data. For instance, the sequence component 116 may determine the monotonic sequence(s) 118 based at least on the text tokens associated with the text represented by the training data 104. For instance, the sequence component 116 may consider mapping input sequences $X=[x_1, x_2, \ldots, x_T]$, such as sequences of text tokens, to corresponding output sequences $Y=[y_1, y_2, \ldots, y_T]$, such as speech tokens. As such, the sequence component 116 may determine, for a given input sequence X, one or more (e.g., all) possible output sequences Y.

The method 800, at block B804, may include determining, based at least on one or more language models processing the text data, one or more cross-attention scores associated with one or more layers of a decoder of the one or more language models. For instance, the language model(s) 102 may process at least a portion of the training data 104, such as the text data representing the text. Based at least on the processing, the language model(s) 102 may generate the cross-attention score(s) 108 associated with the layer(s) of the language model(s) 102. As described herein, the language model(s) 102 may generate a respective cross-attention score 108 associated with one or more (e.g., each) of the layer(s) and/or one or more (e.g., each) of the head(s) of the layer(s).

The method 800, at block B806, may include determining one or more losses based at least on the one or more monotonic sequences and the one or more cross-attention scores. For instance, the training engine 114 may determine the CTC loss(es) based at least on the monotonic sequence(s) 118 and the cross-attention score(s) 108. As described herein, the CTC loss(es) may ensure that the language model(s) 102 attends over one or more text tokens (e.g., all text tokens) sequentially. For instance, in some examples, the training engine 114 may determine a lower loss when a sequence determined by the language model(s) 102 is monotonic and/or covers all of the encoder timesteps and determine a greater loss when the sequence is not monotonic and/or does not cover all of the encoder timesteps.

The method 800, at block B808, may include updating, based at least on the one or more losses, one or more parameters associated with the one or more language models. For instance, the training engine 114 may update the parameter(s) of the language model(s) 102 using at least CTC loss(es).

FIG. 9 illustrates a flow diagram showing a method 900 for training one or more language models using one or more attention priors and one or more CTC losses at various training stages, in accordance with some embodiments of the present disclosure. The method 900, at block B902, may include training, during a first training stage, one or more language models using one or more attention priors. For instance, during the first training stage, the alignment component 110 may use at least a portion of the training data 104 to generate the attention prior(s) 112. The training engine 114 may then use the attention prior(s) 112 to train the language model(s) 102. For instance, and as described herein, the training engine 114 may apply the attention prior 112 to the cross-attention score(s) 108 during the first training stage in order to initialize the cross-attention score(s) 108 to a monotonic heuristic.

The method 900, at block B904, may include training, during a second training stage that include at least a portion of the first training stage, the one or more language models using one or more connectionist temporal classification losses. For instance, during the second training stage, the sequence component 116 may use at least a portion of the training data 104 to generate the monotonic sequence(s) 118. The training engine 114 may then use the monotonic sequence(s) 118 and the cross-attention score(s) 108 to determine the CTC loss(es) and, based at least on the CTC loss(es), update one or more parameters associated with the language model(s) 102. As described herein, in some examples, the training engine 114 may begin training the language model(s) using both the attention prior(s) 112 and the CTC loss(es) during the first training stage, but then only use the CTC loss(es) after the first training stage and for the remainder of the second training stage.

Example Computing Device

Figure 10:
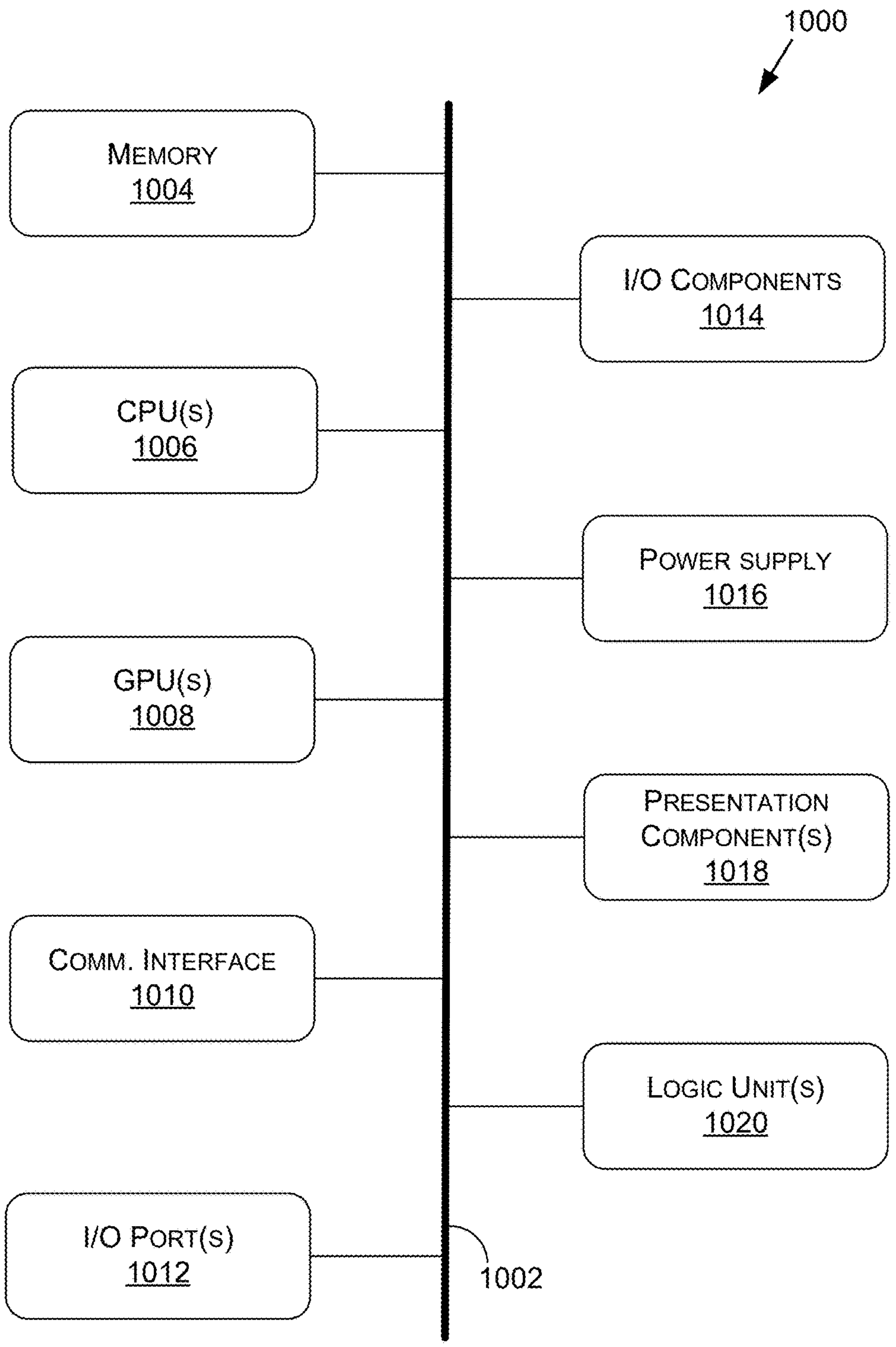
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
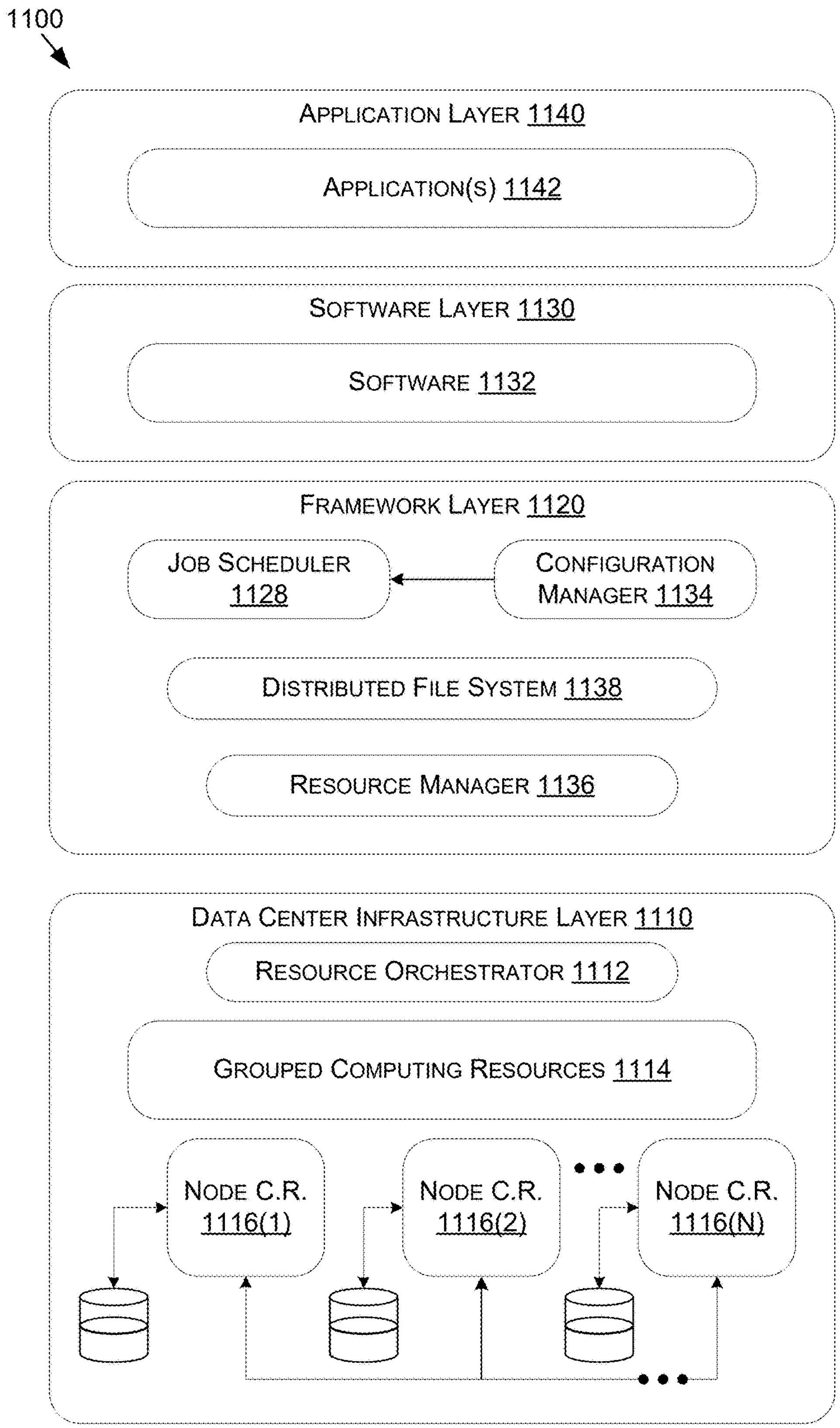
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1128, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application (s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1128 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1128. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

EXAMPLE PARAGRAPHS

A: A method comprising: generating, based at least on one or more language models processing first text data representative of first text, audio data representative of speech associated with the first text, wherein the one or more language models are trained at least by: determining, based at least on the one or more language models processing second text data representative of second text, one or more cross-attention scores associated with one or more layers of a decoder of the one or more language models; determining, based at least on one or more text tokens associated with the second text data and one or more time durations associated with the second text data, one or more attention priors associated with the second text data; and updating one or more parameters associated with the one or more language models based at least on the one or more cross-attention scores and the one or more attention priors.

B: The method of paragraph A, wherein: the determining the one or more cross-attention scores associated with the one or more layers comprises determining, based at least on the one or more language models processing the second text data, at least one or more first cross-attention scores associated with one or more first layers of the one or more layers and one or more second cross-attention scores associated with one or more second layers of the one or more layers; and the updating the one or more parameters associated with the one or more language models is based at least on applying the one or more attention priors to the one or more first cross-attention scores and applying the one or more attention priors to the one or more second cross-attention scores.

C: The method of either paragraph A or paragraph B, wherein: the determining the one or more cross-attention scores associated with the one or more layers comprises determining, based at least on the one or more language models processing the second text data, at least one or more first cross-attention scores associated with a first head of a layer of the one or more layers and one or more second cross-attention scores associated with a second head of the layer of the one or more layers; and the updating the one or more parameters associated with the one or more language models is based at least on applying the one or more attention priors to the one or more first cross-attention scores and applying the one or more attention priors to the one or more second cross-attention scores.

D: The method of any one of paragraphs A-C, wherein the one or more language models are further trained by: determining one or more monotonic sequences associated with the one or more text tokens; and determining one or more losses based at least on the one or more monotonic sequences and the one or more cross-attention scores, wherein the updating of the one or more parameters associated with the one or more language models is further based at least on the one or more losses.

E: The method of paragraph D, wherein the determining the one or more losses comprises: determining one or more first losses of the one or more losses based at least on the one or more monotonic sequences and one or more first cross-attention scores of the one or more cross-attention scores that are associated with one or more first layers of the one or more layers; and determining one or more second losses of the one or more losses based at least on the one or more monotonic sequences and one or more second cross-attention scores of the one or more cross-attention scores that are associated with one or more second layers of the one or more layers.

F: The method of either paragraph D or paragraph E, wherein the determining the one or more losses comprises: determining one or more first losses of the one or more losses based at least on the one or more monotonic sequences and one or more first cross-attention scores of the one or more cross-attention scores that are associated with a first head of a layer of the one or more layers; and determining one or more second losses of the one or more losses based at least on the one or more monotonic sequences and one or more second cross-attention scores of the one or more cross-attention scores that are associated with a second head of the layer of the one or more layers.

G: The method of any one of paragraphs A-F, wherein the one or more attention priors are associated with excluding one or more pairs between the one or more text tokens and one or more speech tokens associated with the one or more time durations.

H: A system comprising: one or more processors to: determine one or more monotonic sequences associated with one or more text tokens corresponding to text data; determine, based at least on one or more language models processing the text data, one or more cross-attention scores associated with one or more layers of a decoder of the one or more language models; determine one or more losses based at least on the one or more monotonic sequences and the one or more cross-attention scores; and update, based at least on the one or more losses, one or more parameters associated with the one or more language models.

I: The system of paragraph H, wherein: the determination of the one or more losses comprises: determining one or more first losses based at least on the one or more monotonic sequences and one or more first cross-attention scores of the one or more cross-attention scores that are associated with one or more first layers of the one or more layers; and determining one or more second losses based at least on the one or more monotonic sequences and one or more second cross-attention scores of the one or more cross-attention scores that are associated with one or more second layers of the one or more layers; and the one or more parameters associated with the one or more language models are updated based at least on the one or more first losses and the one or more second losses.

J: The system of either paragraph H or paragraph I, wherein: the determination of the one or more losses comprises: determining one or more first losses based at least on the one or more monotonic sequences and one or more first cross-attention scores of the one or more cross-attention scores that are associated with a first head of a layer of the one or more layers; and determining one or more second losses based at least on the one or more monotonic sequences and one or more second cross-attention scores of the one or more cross-attention scores that are associated with a second head of the layer of the one or more layers; and the one or more parameters associated with the one or more language models are updated based at least on the one or more first losses and the one or more second losses.

K: The system of any one of paragraphs H-J, wherein the determination of the one or more losses comprises at least one of: determining one or more first losses based at least on the one or more monotonic sequences and one or more first cross-attention scores of the one or more cross-attention scores that are associated with one or more first sequences that are not monotonic; or determining one or more second losses based at least on the one or more monotonic sequences and one or more second cross-attention scores of the one or more cross-attention scores that are associated with one or more second sequences that are monotonic, the one or more second losses being less than the one or more first losses.

L: The system of any one of paragraphs H-K, wherein the one or more processors are further to: determine one or more probabilities associated with the one or more monotonic sequences, wherein the determination of the one or more losses is based at least on the one or more probabilities and the one or more cross-attention scores.

M: The system of any one of paragraphs H-L, wherein the one or more processors are further to: determine, based at least on the one or more text tokens associated with the text data and one or more time durations associated with the text data, one or more attention priors associated with the text data; wherein the one or more parameters associated with the one or more language models are further updated based at least on applying the one or more attention priors to the one or more cross-attention scores.

N: The system of paragraph M, wherein: the one or more cross-attention scores include at least one or more first cross-attention scores associated with one or more first layers of the one or more layers and one or more second cross-attention scores associated with one or more second layers of the one or more layers; and the one or more parameters associated with the one or more language models are updated based at least on the one or more losses, applying the one or more attention priors to the one or more first cross-attention scores, and applying the one or more attention priors to the one or more second cross-attention scores.

O: The system of either paragraph M or paragraph N, wherein: the one or more cross-attention scores include at least one or more first cross-attention scores associated with a first head of a layer of the one or more layers and one or more second cross-attention scores associated with a second head of the layer of the one or more layers; and the one or more parameters associated with the one or more language models are updated based at least on the one or more losses, applying the one or more attention priors to the one or more first cross-attention scores, and applying the one or more attention priors to the one or more second cross-attention scores.

P: The system of any one of paragraphs M-O, wherein: the one or more parameters associated with the one or more language models are updated using the one or more losses and the applying the one or more attention priors to the one or more cross-attention scores during a first training stage; and the one or more processors are further to: determine one or more second monotonic sequences associated with one or more second text tokens corresponding to second text data; determine, based at least on the one or more language models processing the second text data, one or more second cross-attention scores associated with the one or more layers of the decoder of the one or more language models; determine one or more second losses based at least on the one or more second monotonic sequences and the one or more second cross-attention scores; and update, during a second training stage and based at least on the one or more second losses, the one or more parameters associated with the one or more language models without using one or more second attention priors associated with the second text data.

Q: The system of any one of paragraphs H-P, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

R: One or more processors comprising: processing circuitry to perform one or more operations using one or more language models, wherein the one or more language models are trained based at least on one more cross-attention scores determined using one or more layers of a decoder associated with the one or more language models and at least one of one or more attention priors or one or more monotonic sequences, wherein at least one of the one or more attention priors or the one or more monotonic sequences are determined using one or more text tokens associated with text data processed using the one or more language models.

S: The one or more processors of paragraph R, wherein the one or more cross-attention scores include at least one of: first cross-attention scores associated with layers of the one or more layers; or second cross-attention scores associated with heads of a layer of the one or more layers.

T: The one or more processors of either paragraph R or paragraph S, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

Any, some and/or all features in one aspect of the disclosure may be applied to other aspects of the disclosure, in any appropriate combination or sub-combination. In particular, device aspects may be applied to method aspects, and vice versa. It should also be appreciated that particular combinations of the various features described and defined in any aspect or embodiment of the disclosure can be implemented and/or supplied and/or used independently.

The various features described in the description as optional—such as by use of "may" or "can"—may be combined into a single embodiment, and/or any combination of the features may be combined to form various embodiments that rely on the combination of these various optional features.

What is claimed is:

1. A method comprising:

determining, based at least on one or more language models processing text data representative of text, one or more cross-attention scores associated with one or more layers of a decoder of the one or more language models;

determining, based at least on one or more text tokens associated with the text data and one or more time durations associated with aligning one or more speech tokens output by the decoder with the one or more text tokens, one or more attention priors associated with the text data; and updating one or more parameters associated with the one or more language models based at least on the one or more cross-attention scores and the one or more attention priors.

2. The method of claim 1, wherein:

the determining the one or more cross-attention scores associated with the one or more layers comprises determining, based at least on the one or more language models processing the text data, at least one or more first cross-attention scores associated with one or more first layers of the one or more layers and one or more second cross-attention scores associated with one or more second layers of the one or more layers; and the updating the one or more parameters associated with the one or more language models is based at least on applying the one or more attention priors to the one or more first cross-attention scores and applying the one or more attention priors to the one or more second cross-attention scores.

3. The method of claim 1, wherein:

the determining the one or more cross-attention scores associated with the one or more layers comprises determining, based at least on the one or more language models processing the text data, at least one or more first cross-attention scores associated with a first head of a layer of the one or more layers and one or more second cross-attention scores associated with a second head of the layer of the one or more layers; and the updating the one or more parameters associated with the one or more language models is based at least on applying the one or more attention priors to the one or more first cross-attention scores and applying the one or more attention priors to the one or more second cross-attention scores.

4. The method of claim 1, further comprising:

determining one or more monotonic sequences associated with the one or more text tokens; and determining one or more losses based at least on the one or more monotonic sequences and the one or more cross-attention scores, wherein the updating of the one or more parameters associated with the one or more language models is further based at least on the one or more losses.

5. The method of claim 4, wherein the determining the one or more losses comprises:

determining one or more first losses of the one or more losses based at least on the one or more monotonic sequences and one or more first cross-attention scores of the one or more cross-attention scores that are associated with one or more first layers of the one or more layers; and determining one or more second losses of the one or more losses based at least on the one or more monotonic sequences and one or more second cross-attention scores of the one or more cross-attention scores that are associated with one or more second layers of the one or more layers.

6. The method of claim 4, wherein the determining the one or more losses comprises:

determining one or more first losses of the one or more losses based at least on the one or more monotonic sequences and one or more first cross-attention scores of the one or more cross-attention scores that are associated with a first head of a layer of the one or more layers; and determining one or more second losses of the one or more losses based at least on the one or more monotonic sequences and one or more second cross-attention scores of the one or more cross-attention scores that are associated with a second head of the layer of the one or more layers.

7. The method of claim 1, wherein the one or more attention priors are associated with excluding one or more pairs between the one or more text tokens and the one or more speech tokens associated with the one or more time durations.

8. A system comprising:

one or more processors to:

determine one or more monotonic sequences associated with one or more text tokens corresponding to text data;

determine, based at least on one or more language models processing the text data, one or more cross-attention scores associated with one or more layers of a decoder of the one or more language models;

determine one or more losses based at least on whether the one or more monotonic sequences indicate that one or more sequences associated with the one or more cross-attention scores are monotonic; and update, based at least on the one or more losses, one or more parameters associated with the one or more language models.

9. The system of claim 8, wherein:

the determination of the one or more losses comprises:

determining one or more first losses based at least on whether the one or more monotonic sequences indicate that one or more first cross-attention scores of the one or more cross-attention scores that are associated with one or more first layers of the one or more layers are monotonic; and determining one or more second losses based at least on whether the one or more monotonic sequences indicate that one or more second cross-attention scores of the one or more cross-attention scores that are associated with one or more second layers of the one or more layers are monotonic; and the one or more parameters associated with the one or more language models are updated based at least on the one or more first losses and the one or more second losses.

10. The system of claim 8, wherein:

the determination of the one or more losses comprises:

determining one or more first losses based at least on whether the one or more monotonic sequences indicate that one or more first cross-attention scores of the one or more cross-attention scores that are associated with a first head of a layer of the one or more layers are monotonic; and determining one or more second losses based at least on whether the one or more monotonic sequences indicate that one or more second cross-attention scores of the one or more cross-attention scores that are associated with a second head of the layer of the one or more layers are monotonic; and the one or more parameters associated with the one or more language models are updated based at least on the one or more first losses and the one or more second losses.

11. The system of claim 8, wherein the determination of the one or more losses comprises at least one of:

determining one or more first losses based at least on the one or more monotonic sequences indicating that one or more first sequences of the one or more sequences are not monotonic; or determining one or more second losses based at least on the one or more monotonic indicating that one or more second sequences that of the one or more sequences are monotonic, the one or more second losses being less than the one or more first losses.

12. The system of claim 8, wherein the one or more processors are further to:

determine one or more probabilities associated with the one or more monotonic sequences; and determine the one or more sequences based at least on the one or more probabilities.

13. The system of claim 8, wherein the one or more processors are further to:

determine, based at least on the one or more text tokens associated with the text data and one or more time durations associated with the text data, one or more attention priors associated with the text data;

wherein the one or more parameters associated with the one or more language models are further updated based at least on applying the one or more attention priors to the one or more cross-attention scores.

14. The system of claim 13, wherein:

the one or more cross-attention scores include at least one or more first cross-attention scores associated with one or more first layers of the one or more layers and one or more second cross-attention scores associated with one or more second layers of the one or more layers; and the one or more parameters associated with the one or more language models are updated based at least on the one or more losses, applying the one or more attention priors to the one or more first cross-attention scores, and applying the one or more attention priors to the one or more second cross-attention scores.

15. The system of claim 13, wherein:

the one or more cross-attention scores include at least one or more first cross-attention scores associated with a first head of a layer of the one or more layers and one or more second cross-attention scores associated with a second head of the layer of the one or more layers; and the one or more parameters associated with the one or more language models are updated based at least on the one or more losses, applying the one or more attention priors to the one or more first cross-attention scores, and applying the one or more attention priors to the one or more second cross-attention scores.

16. The system of claim 13, wherein:

the one or more parameters associated with the one or more language models are updated using the one or more losses and the applying the one or more attention priors to the one or more cross-attention scores during a first training stage; and the one or more processors are further to:

determine one or more second monotonic sequences associated with one or more second text tokens corresponding to second text data;

determine, based at least on the one or more language models processing the second text data, one or more second cross-attention scores associated with the one or more layers of the decoder of the one or more language models;

determine one or more second losses based at least on the one or more second monotonic sequences and the one or more second cross-attention scores; and update, during a second training stage and based at least on the one or more second losses, the one or more parameters associated with the one or more language models without using one or more second attention priors associated with the second text data.

17. The system of claim 8, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing operations using one or more vision language models (VLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

18. One or more processors comprising:

processing circuitry to:

determine, based at least on one or more language models processing text data representative of text, one or more cross-attention scores associated with one or more layers of a decoder of the one or more language models;

determine, based at least on one or more text tokens associated with the text data and one or more time durations associated with aligning one or more mel-spectrograms with the one or more text tokens, one or more attention priors associated with the text data; and updating one or more parameters associated with the one or more language models based at least on the one or more cross-attention scores and the one or more attention priors.

19. The one or more processors of claim 18, wherein the one or more cross-attention scores include at least one of:

first cross-attention scores associated with layers of the one or more layers; or second cross-attention scores associated with heads of a layer of the one or more layers.

20. The one or more processors of claim 18, wherein the one or more processors are comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing operations using one or more vision language models (VLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *